(12) United States Patent
Zhu et al.

(10) Patent No.: US 6,251,175 B1
(45) Date of Patent: Jun. 26, 2001

(54) JET INK COMPOSITION

(75) Inventors: Linfang Zhu, Naperville; Mohammed Siddiqui, Carol Stream, both of IL (US)

(73) Assignee: Marconi Data Systems Inc., Wood Dale, IL (US)

( * ) Notice: Subject to any disclaimer, the term of this patent is extended or adjusted under 35 U.S.C. 154(b) by 0 days.

(21) Appl. No.: 09/130,675

(22) Filed: Aug. 6, 1998

(51) Int. Cl.$^7$ .................................................. C09D 11/00
(52) U.S. Cl. ..................... 106/31.58; 106/31.43; 106/31.27; 106/31.28; 106/31.86; 528/212; 528/271
(58) Field of Search ............................... 106/31.43, 31.58, 106/31.27, 31.86, 31.28; 528/212, 271

(56) References Cited

U.S. PATENT DOCUMENTS

| | | |
|---|---|---|
| 3,028,349 | 4/1962 | Rowland et al. . |
| 3,060,429 | 10/1962 | Winston . |
| 3,298,030 | 1/1967 | Lewis et al. . |
| 3,373,437 | 3/1968 | Sweet et al. . |
| 3,416,153 | 12/1968 | Hertz et al. . |
| 3,673,601 | 6/1972 | Hertz . |
| 3,687,887 | 8/1972 | Zabiak . |
| 4,177,076 | 12/1979 | Sato . |
| 4,834,799 | 5/1989 | Song . |
| 4,880,487 | 11/1989 | Sheehan et al. . |
| 5,004,762 | 4/1991 | Gupta . |
| 5,061,760 | 10/1991 | East et al. . |
| 5,143,947 | 9/1992 | Gupta . |
| 5,158,606 | 10/1992 | Carlick et al. . |
| 5,239,015 | 8/1993 | Sheehan et al. . |
| 5,316,575 * | 5/1994 | Lent et al. ........................... 106/20 R |
| 5,342,727 * | 8/1994 | Vicari et al. ......................... 430/157 |
| 5,453,483 * | 9/1995 | Sounik et al. ........................ 528/212 |
| 5,510,420 | 4/1996 | Dammel et al. . |
| 5,554,719 * | 9/1996 | Sounik ................................ 528/212 |
| 5,596,027 | 1/1997 | Mead et al. . |

FOREIGN PATENT DOCUMENTS

| | | |
|---|---|---|
| 45812/96 * | 9/1996 | (AT) . |
| 45812/96 | 9/1996 | (AU) . |
| 04057866 | 2/1992 | (EP) . |
| 61-009427 | 1/1986 | (JP) . |
| 9519401 | 7/1995 | (WO) . |

OTHER PUBLICATIONS

Kuhn et al., Ink Jet Printing, *Scientific American*, 162–178 (Apr. 1979).

Keeling, Ink Jet Printing, *Phys. Technol.*, 12(5), 196–303 (1981).

PCT Search Report, Jan. 16, 1998, International Application No. PCT GB 97/02598.

* cited by examiner

*Primary Examiner*—David W. Wu
*Assistant Examiner*—Ling-Siu Choi
(74) *Attorney, Agent, or Firm*—Leydig, Voit & Mayer, Ltd.

(57) ABSTRACT

The present invention provides a jet ink composition and a method of jet printing onto non-porous substrates such as glass, metal, ceramics, and plastics images which have improved adhesion. The jet ink composition, which has short dry times, comprises an organic solvent, colorant, and a hydroxyaromatic resin with its hydroxyaromatic units being linked by a linkage other than alkylene ether linkage. The hydroxyaromatic units of the hydroxyaromatic resin are linked by, for example, an alkylene linkage. An example of a suitable hydroxyaromatic unit is a phenol. An example of the organic solvent is ethanol. The jet ink composition provides short dry times on non-porous substrates. In some embodiments of the ink composition, the image adhesion can be further improved by the use of an adhesion promoter such as a silane, a dendrimer, or a combination thereof.

9 Claims, No Drawings

JET INK COMPOSITION

CROSS-REFERENCE TO A RELATED APPLICATION

This is a continuation-in-part of U.S. patent application Ser. No. 08/718,783, filed Sep. 24, 1996, the specification of which is incorporated herein in its entirety by reference.

TECHNICAL FIELD OF THE INVENTION

The present invention relates to an ink jet ink composition in general, and to an ink jet ink composition suitable for printing images on non-porous substrates with improved adhesion.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream, e.g., electronically, so that the droplets are caused to form the desired printed image on that surface. This technique of noncontact printing is well suited for application of characters onto a variety of surfaces including porous and non-porous surfaces.

Reviews of various aspects of ink jet printing can be found in these publications: Kuhn et al., *Scientific American*, April, 1979, 162–178; and Keeling, *Phys. Technol.*, 12(5), 196–303 (1981). Various ink jet apparatuses are described in the following U.S. Patents: U.S. Pat. Nos. 3,060,429, 3,298,030, 3,373,437, 3,416,153, and 3,673,601.

In general, an ink jet ink composition must meet certain rigid requirements to be useful in ink jet printing operations. These relate to viscosity, resistivity, solubility, compatibility of components, and wettability of the substrate. Further, the ink must be quick-drying and smear resistant, must be capable of passing through the ink jet nozzle without clogging, and must permit rapid cleanup of the machine components with minimum effort. In addition, the jet ink composition should provide printed images that adhere well to the substrates, particularly non-porous substrates. Those of ordinary skill in the art know of challenges that non-porous substrates pose in achieving image adhesion.

Ink jet ink compositions have been disclosed. They generally contain an ink carrier, a binder resin, a colorant, and other optional additives. The carrier can be an aqueous or non-aqueous solvent. For jet printing on non-porous substrates such as glass, ceramics, metal or plastics, ink jet ink compositions have been prepared mostly using non-aqueous solvents.

Thus, ink jet inks for non-porous substrates are generally based on methanol and methyl ethyl ketone (MEK). These solvents offer fast drying jet inks and have the ability to dissolve or disperse binder resins and colorants. Additionally, these solvents have the ability to ionize conducting agents and thus provide good conductivity, especially for continuous ink jet printing operation. Thus, for example, U.S. Pat. No. 4,834,799 discloses a jet ink composition suitable for jet printing onto vinyl substrates which contain vinyl polymers and plasticizers. The composition is formulated to include a resin component having a pendant amino group such as a copolymer of methyl methacrylate and dimethylaminoethyl methacrylate, a dye, and a carrier. The carrier typically comprises a mixture of a lower alcohol such as methanol and a lower ketone such as MEK.

However, in view of the increasing public awareness and governmental regulations concerning the safety of MEK and methanol, it has become important to develop jet inks that do not contain a significant amount of MEK or methanol. To achieve this goal, ethanol based jet inks have been proposed. For example, UK Patent Application GB 2 286 402 discloses a jet ink for continuous ink jet printers containing ethanol as the liquid vehicle and a polyamide resin as the binder resin. Although ethanol based jet inks have served with some success, certain ethanol based inks do not dry fast enough for many ink jet applications due to the slow evaporation of ethanol.

Thus, there exists a need for a jet ink composition suitable for printing on non-porous substrates such as glass, plastic, metal, or ceramics, images with improved adhesion. There also exists a need for a jet ink composition that is substantially free of methanol and MEK. There further exists a need for a jet ink composition that dries fast enough for use in continuous jet ink printers. There further exists a need for an ethanol based jet ink composition that provides short drying times.

These and other objects of the present invention will be apparent from the detailed description of certain embodiments of the invention set forth below.

SUMMARY OF THE INVENTION

The foregoing needs have been fulfilled to a great extent by the present invention which provides a jet ink composition comprising an organic solvent, a colorant, and a hydroxyaromatic resin with its hydroxyaromatic units being linked to one another by linkages other than alkylene ether linkages. The images printed on non-porous substrates using the jet ink composition of the present invention have improved adhesion, e.g., improved rub resistance and tape peel resistance.

The present invention further provides a method of forming printed images on porous and non-porous surfaces using the ink composition of the present invention. In one aspect of the present the invention, the method comprises projecting a stream of droplets of the ink composition onto a surface and controlling the direction of the stream, e.g., electronically, so that the ink droplets form the desired printed image on the surface.

While the invention has been described and disclosed below in connection with certain embodiments and procedures, it is not intended to limit the invention to those specific embodiments. Rather it is intended to cover all such alternative embodiments and modifications as fall within the spirit and scope of the invention.

DETAILED DESCRIPTION OF THE EMBODIMENTS

The present invention provides a jet ink composition comprising an ink carrier, a colorant, and a hydroxyaromatic resin. Preferably, the resin is free or substantially free of alkylene ether linkages. Thus, the hydroxyaromatic resin has hydroxyaromatic repeat units which are linked to one another, by linkages other than alkylene ether linkages. The jet ink composition of the present invention are free or substantially free of MEK and methanol and are suitable for printing images with improved adhesion on non-porous substrates such as glass, metals, ceramics, and plastics.

General Properties

In general, the jet ink composition of the present invention exhibits the following characteristics for use in ink jet printing systems: (1) a viscosity of from about 1.6 to about 7.0 centipoises (cps) at 25° C.; (2) an electrical resistivity of from about 50 to about 2000 ohm-cm; and (3) a sonic velocity of from about 1100 to about 1700 meters/second.

A detailed discussion of the ingredients and the characteristics of the inventive jet ink composition are set forth below.

Ink Carrier

Any suitable organic solvent can be used as the ink carrier. Suitable organic solvents include alcohols, esters, ketones, amides, ethers, and halides. Alcohols other than methanol and MEK are preferred solvents. Particular examples of preferred solvents include ethanol and acetone. Typically the carrier is present in an amount of from about 40% by weight to about 90% by weight, and preferably from about 60% by weight to about 85% by weight of the jet ink composition. A mixture of solvents can also be used. For example, a mixture of acetone and ethanol can be used. Preferably, the amount of acetone in the mixture is less than that of ethanol. Thus, acetone can be used in an amount of up to about 30% by weight and ethanol up to about 70% by weight, and preferably acetone can be used in an amount of up to about 25% by weight and ethanol up to about 75% of the solvent mixture. Small quantities of water can also be used in the carrier to provide the necessary electrical conductivity when using non-aqueous solvents as the jet ink carrier.

Colorant

The jet ink composition of the present invention comprises one or more colorants that impart the desired color to the printed message. Any dye, pigment, lake, or combinations thereof, that may be dissolved or dispersed in the ink composition can be used. Dyes are particularly preferred for use with non-aqueous solvents.

Examples of dyes suitable for use in the preparation of the ink composition of the present invention include, but are not limited to, yellow dyes such as C.I. Solvent Yellow 19 (C.I. 13900A), C.I. Solvent Yellow 21 (C.I. 18690), C.I. Solvent Yellow 61, C.I. Solvent Yellow 80, FD&C Yellow #5, Yellow Shade 16948, Acid Yellow 23, Levaderm Lemon Yellow (Mobay), Spirit Fast Yellow 3G, Aizen Spilon Yellow C-GNH (Hodagaya Chemical Co.), Pergasol Yellow CGP (Ciba-Geigy), and the like, the orange dyes such as C.I. Solvent Orange 1 (C.I. 11920), C.I. Orange 37, C.I. Orange 40, Diaresin Orange K (Mitsubishi Chemical Industries, Ltd.), Diaresin Orange G (Mitsubishi Chemical Industries, Ltd.), Sumiplast Orange 3G (Sumitomo Chemical Co., Ltd.), and the like, red dyes such as C.I. Solvent Red 8, C.I. Solvent Red 81, C.I. Solvent Red 82, C.I. Solvent Red 84, C.I. Solvent Red 100, Cibacron Brilliant Red 38-A (Aldrich Chemical Co.), Drimarene Brilliant Red E-6A (Pylam, Inc.), Acid Red 92, Reactive red 31 (ICI America), and the like, pink dyes such as Diaresin Pink M (Mitsubishi Chemical Industries, Ltd.), Sumiplast Pink RFF (Sumitomo Chemical Co.), Direct Brill Pink B Ground Crude (Crompton & Knowles), and the like, violet dyes such as Basic Violet 3, C.I. Solvent Violet 8, C.I. Solvent Violet 21, Diaresin Violet (Mitsubishi), Diaresin Violet D, Sumiplast Violet RR (Sumitomo), and the like, blue dyes such as C.I. Solvent Blue 2, C.I. Solvent Blue 11, C.I. Solvent Blue 25, C.I. Solvent Blue 36, C.I. Solvent Blue 55, and the like, green dyes such as C.I. Solvent Green 3 and the like, brown dyes such as C.I. Solvent Brown 3 and Diaresin Brown A (Mitsubishi), and the like, and black dyes such as Nigrosine dyes, C.I. Solvent Black 3, C.I. Solvent Black 5, C.I. Solvent Black 7, C.I. Solvent Black 22, C.I. Solvent Black 27, C.I. Solvent Black 29, C.I. Solvent Black 48, Acid Black 123, and the like.

Any suitable amount of the colorant can be used. The colorant is preferably present in an amount of from about 0.1% by weight to about 15% by weight of the jet ink composition, more preferably in an amount of from about 1% by weight to about 12% by weight of the jet ink composition, and even more preferably in an amount of from about 10% by weight to about 12% by weight of the jet ink composition.

Binder Resin

Any suitable binder resin can be used that provides a rapid dry time, which is preferably less than 6 seconds, more preferably less than 3 seconds, and even more preferably in the range of about 1–3 seconds. Thus, resins which are rapid film-formers are preferred. Suitable binder resins that can be used in the ink composition of the present invention include resins that are soluble or dispersible in the ink carrier. The binder resin may form a true solution or a colloidal suspension that may be used if filterable without substantial separation through a filter having a pore size substantially smaller than the printer capillary tube, for example, through a 1 $\mu$m filter.

The binder resin is preferably a polymer composed of hydroxyaromatic repeat units. The polymer is free or substantially free of alkylene ether linkages. The hydroxyaromatic polymers suitable for use in the ink composition of the present invention are preferably non-aldehyde derived phenolic polymers.

An advantage of the jet ink composition of the present invention is that the binder resin employed is free or substantially free of aldehydes, such as formaldehyde, which are the undesirable residues frequently found in aldehyde derived phenolic resins such as novolaks and resoles. Formaldehyde is toxic and a suspected carcinogen. It is believed that the aldehyde residues which are often found in the resin adversely affects the color characteristics of certain dyes, e.g., azo dyes. Thus, hydroxyaromatic polymers free of aldehydes are preferred.

Further, phenolic resins such as those made from a phenol and an aldehyde have alkylene ether linkages and provide undesirably long ink dry times compared to hydroxyaromatic resins with other linkages, e.g., alkylene linkages.

The aromatic ring of the hydroxyaromatic unit can be composed of 1–3 rings, and preferably a 1-ring unit such as phenyl or substituted phenyl. It is further preferred that the hydroxyaromatic unit is hydroxyphenyl. The hydroxyaromatic units can be linked to one another by any suitable linkages. A suitable linkage is alkylene linkage. The alkylene linkage can have any number of carbon atoms, for example, 1 to 6 carbon atoms, preferably 1 to 3 carbon atoms. The alkylene linkage can be linear such as —$CH_2$—, —$CH_2CH_2$—, or —$CH_2CH_2CH_2$—, or branched such as —$CH(CH_3)$—.

The aromatic rings can be linked to one another at positions ortho, meta, or para to the hydroxy group, preferably at ortho and para positions. The hydroxyaromatic polymers can be obtained commercially or synthesized by methods known to those of ordinary skill in the art.

The hydroxyaromatic polymers, which can be linear, branched, or a combination of the two, can be prepared by methods described in U.S. Pat. Nos. 5,239,015, 5,453,483, and 5,554,719. Thus, for example, a linear poly(4-hydroxystyrene) can be prepared by the free radical initiated polymerization of 4-acetoxystyrene, followed by transesterification with an alcohol, as described in U.S. Pat. No. 5,239,015, column 8, line 46, to column 13, line 53, the disclosure of which is incorporated herein by reference. A hydroxyaromatic polymer having a branched structure can be prepared by reacting a substituted phenyl carbinol with a carboxylic acid, followed by polymerizing the reaction mixture, as described in U.S. Pat. No. 5,554,719, column 2, line 34, to column 5, line 43, the disclosure of which is incorporated herein by reference. The hydroxyaromatic polymers also can be prepared by a two-step process. In the first step, a carbinol such as a hydroxyphenyl carbinol is dehydrated, and in the second step, the dehydrated material is polymerized, as described in U.S. Pat. No. 5,453,483, column 2, line 6, to column 4, line 7, the disclosure of which is incorporated herein in its entirety by reference.

A family of hydroxyaromatic polymers is available from TriQuest, LP, in Dallas, Tex. Particular examples of these polymers are PHS-E™, which is a linear polymer produced from acetoxystyrene monomer by free radical polymerization followed by deacetylation, and has a $C_3$-alkylene linkage, PHS-PG™, which is a hydroxyaromatic polymer composed of linear and branched alkylene linkages and produced from acid catalyzed polymerization of 4-hydroxyphenylmethyl carbinol, and PHS-N™, which is a 100% branched polymer produced via acid catalyzed polymerization of 4-hydroxyphenylmethyl carbinol.

The jet ink composition of the present invention also can employ hydroxyaromatic polymers which are copolymers. For example, these can be copolymers of hydroxystyrene and an acrylate monomer. Such copolymers can be produced by free radical initiated polymerization of, e.g., 4-acetoxystyrene and an acrylate monomer, followed by removal of the acetyl groups.

The jet ink composition of the present invention can include, in addition, one or more additional binder resins known in the art. Examples of such binder resins include rosins and modified rosins, shellac, asphalts, alkyd resins, polystyrene resins and copolymers thereof such as styrene acrylic copolymers, terpene resins, polyamide resins, polyimide resins, vinyl resins, such as polyvinyl acetate and polyvinyl alcohol, ketone resins, acrylic resins, such as polyacrylic acid and polymethacrylic acid, epoxide resins, polyurethane resins, and cellulosic resins, such as nitro cellulose, ethyl cellulose, cellulose acetate butyrate, and carboxymethyl cellulose.

Examples of acrylic resins include styrene-acrylic resins which can be made by copolymerizing styrene with acrylic monomers such as acrylic acid, or methacrylic, and optionally with alkyl acrylate monomers such as methyl acrylate, methyl methacrylate, butyl acrylate, butyl methacrylate, hydroxyethyl acrylate, hydroxyethyl methacrylate, and the like. Several styrene-acrylic resins are commercially available. For example, Rohm & Haas Co., in Philadelphia, Pa., sells RHOPLEX™ AC-261, which is an acrylic polymer emulsion. S.C. Johnson & Co., in Racine, Wis. sells styrene acrylics under the tradename JONCRYL™. Examples of JONCRYL resins include JONCRYL 555, 586, 678, 680, 682, 683, and 67. JONCRYL 682, a preferred resin, has a weight average molecular weight of about 1700, an acid number of about 238, a softening temperature of about 105° C., and a glass transition temperature of about 56° C.

Another preferred additional binder resin is a thermoplastic polyurethane, preferably a flexible thermoplastic urethane. Flexible thermoplastic polyurethane resins can be produced by the reaction of suitable diols and diisocyanates. Examples of suitable diols include ethylene glycol, propylene glycol, propanediol, butanediol, polyethylene glycol, polypropylene glycol, polyethylene glycol adipate diol, polyethylene glycol succinate diol, and polytetrahydrofuran diol. Examples of suitable diisocyanates include 2,4-tolylene diisocyanate, 2,6-tolylene diisocyanate, 4,4'-diphenylmethane diisocyanate, and hexamethylene diisocyanate. Polyurethanes made from polypropylene glycol and 4,4'-diphenylmethane diisocyanate are particularly preferred. Polyurethanes having a weight average molecular weight in the range of from about 4,000 to about 22,000 are preferred and polyurethanes having a weight average molecular weight in the range of from about 7,000 to about 9,000 are further preferred.

Examples of preferred polyurethanes that are useful in the present invention include, but are not limited to, the flexible thermoplastic polyurethane solutions sold under the commercial name of SURKOPAK™ by Kane International Corp. (Mitchanol), Rye, N.Y. Several grades of polyurethanes are sold under this name and include SURKOPAK 2135, SURKOPAK 5299, SURKOPAK 5244, SURKOPAK 5255, SURKOPAK 2X, SURKOPAK 5322, SURKOPAK 5311, and SURKOPAK XL. The properties of the polyurethane solutions are presented in Table 1 below.

TABLE 1

Properties of the SURKOPAK Polyurethane Resins

| Grade | 2135 | 5299 | 5244* | 5255 | 2X | 5322** | 5311 | XL |
|---|---|---|---|---|---|---|---|---|
| Solids % | 80–85 | 80–85 | 73–78 | 73–78 | 65–70 | 68–73 | 63–68 | 68–73 |
| Viscosity (Poise) | 15–25 | 25–30 | 12–16 | 25–30 | 40–50 | 6–8 | 30–40 | 15–20 |
| Solvent | A | A | E | E | E | E/A | E | E/A |
| Flash Point, ° C. | 12 | 12 | −4 | −4 | −4 | −4 | −4 | −4 |

A = Alcohol; E = Ester; E/A = Mixture of E and A
*Weight Average Molecular Weight Range 18,000–22,000
**Weight Average Molecular Weight Range 7,000–9,000

These SURKOPAK polyurethanes are non-reactive and are essentially free of isocyanate groups. Among these preferred polyurethane solutions, SURKOPAK 5322 is further preferred. SURKOPAK 5322, a polyurethane composed of polypropylene glycol and 4,4'-diphenylmethane diisocyanate, is sold as a solution in a mixed solvent containing ethyl acetate and isopropanol.

The binder resins can have any suitable molecular weight. The weight average molecular weight of the binder resin is typically in the range of from about 1,500 to about 1,000,000, preferably in the range of from about 4,000 to about 50,000, and more preferably in the range of from about 4,000 to about 10,000.

The binder resins can have any suitable glass transition temperature. The glass transition temperature of the binder resin is generally from about 50° C. to about 200° C., preferably from about 80° C. to about 150° C., and more preferably from about 100° C. to about 150° C.

The binder resin can be present in the ink composition in an amount sufficient to provide good adhesion of the images to the substrates. The resin is generally present in the ink composition in an amount of from about 1% by weight to about 40% by weight of the composition, preferably in an amount of from about 2% by weight to about 20% by weight of the composition, and more preferably in an amount of from about 5% by weight to about 15% by weight of the ink composition. Excessive use of the resin may increase the viscosity of the ink composition, which may lead to poor printing operation and/or poor quality of the printed message such as smearing.

Conductivity Agent

Jet printing ink compositions, for best results, should have a low specific resistivity, such as within the range of about 20 to about 2000 ohm-cm. The desired conductivity can be achieved by the addition of an ionizable material. Examples of such ionizable materials include ammonium, alkali, and alkaline earth metal salts such as ammonium hydroxide, lithium nitrate, lithium chloride, lithium thiocyanate, lithium trifluoromethanesulfonate, sodium chloride, potassium chloride, potassium bromide, calcium chloride, and the like, dimethylamine hydrochloride, and hydroxylamine hydrochloride. Any suitable amount of the ionizable material can be used. Normally, an ionizable material content of up to about 2% by weight of the ink composition provides the desired conductivity.

Surfactant

The jet ink composition of the present invention may further contain a surfactant. The surfactant helps in obtaining good wetting of the substrates by the ink composition. In some instances, the surfactant controls the ink dry times. The surfactant may be anionic, cationic, nonionic, or amphoteric. Examples of anionic surfactants include, but are not limited to, alkylbenzene sulfonates such as dodecylbenzene sulfonate, alkylnaphthyl sulfonates such as butyl or nonyl naphthyl sulfonate, dialkyl sulfosuccinates such as diamyl sulfosuccinate alcohol sulfates such as sodium lauryl sulfate, and perfluorinated carboxylic acids such as perfluorodecanoic acid and perfluorododecanoic acid.

Nonionic surfactants include silicones, alkylesters of polyethylene glycol, fatty acid esters of glycerol, fatty acid esters of glycol, and the like, and fluorochemical surfactants such as FC 170C, FC 430, FC 431, FC 740, FC 120, FC 248, FC 352, FC 396, FC 807, and FC 824, which are available from 3M Co. FC 430 and FC 431 are fluoroaliphatic polymeric esters. Cationic surfactants include alkylamines, amine oxides, amine ethoxylates, alkyl hydroxyalkyl imidazolines, quaternary ammonium salts, and amphoteric surfactants include the alkylbetaines, the amidopropylbetaines, and the like.

Particular examples of surfactants include the polyoxyethylene adducts of fluoroaliphatic sulfonamido alcohols of the formula $R_fSO_2N(C_2H_5)(CH_2CH_2O)_xH$, wherein $R_f=C_nF_{2n+1}$, n is about 5–10 and preferably 7–9, and x is about 10–20 and preferably about 12–16. For example, FC 170C, is 80% active, amber colored, and nonionic. FC 170C has the structure of $R_fSO_2N(C_2H_5)(CH_2CH_2O)_xH$, wherein $R_f=C_nF_{2n+1}$, n is about 8, and x is 14.

The surfactant may be present in the ink composition in any suitable amount. It is typically present in an amount of from about 0.01% to about 1% by weight of the ink composition, preferably in an amount of from about 0.1% to about 0.5% by weight of the ink composition, and more preferably in an amount of from about 0.2% to about 0.4% by weight of the ink composition.

Adhesion Promoter

The ink composition of the present invention may further include one or more adhesion promoters to further improve the adhesion of the printed images to the substrates. Any suitable adhesion promoters known to those of ordinary skill in the art can be utilized. Examples of adhesion promoters include silanes, dendrimers, and transition metal organates.

Examples of silanes includes organosilanes such as trichlorosilane, vinyltrichlorosilane, methyltrichlorosilane, methyldichlorosilane, dimethyldichlorosilane, methylvinyldichlorosilane, hexamethyldisilizane, methyltriethoxysilane, methyltrimethoxysilane, vinyltriethoxysilane, vinyltrimethoxysilane, vinyl-tris(2-methoxyethoxysilane), vinyltriacetoxysilane, gamma-methacryloxypropyl-trimethoxysilane, gamma-methacryloxypropyl-tris-(2-methoxyethoxy)silane, beta-(3, 4-epoxycyclohexyl)ethyltrimethoxysilane, and gamma-glycidoxypropyltrimethoxysilane. Gamma-glycidoxypropyltrimethoxysilane is a preferred organosilane and is sold as Silane A-187 by OSI Specialties Group in Tarrytown, N.Y.

Dendrimers are radially symmetric molecules comprising an initiator core, such as nitrogen, interior layers attached to the core and comprised of suitable number of arms, each arm being comprised of repeating units with the number of repeating units in each arm being considered the generation of the dendrimer, and terminal group functionality, such as, for example, a primary amine attached to the outermost generation. An example of a suitable dendrimer is the polyamidoamine (PAMAM) type dendrimer.

The dendrimer is preferably a hydrophobically modified dendrimer. Any suitable hydrophobic modification can be applied, preferably a hydrophobic alkyl group such as a long chain alkyl, for example, a $C_3$–$C_{22}$ alkyl group, and preferably a $C_6$–$C_{12}$ alkyl group. An example of a preferred dendrimer is the 25% $C_{12}$-modified PAMAM dendrimer of generation 2 (G2) which can be obtained from Dendritech, Inc., Ann Arbor, Mich. The G2 dendrimer has 16 $NH_2$ groups. One mole of the G2 dendrimer can, therefore, react with 32 moles of 1,2-epoxydodecane to give 100% substitution which converts the primary amine terminal groups to tertiary amines. A 25% modified dendrimer can be produced by reacting one mole of PAMAM with 8 moles of 1,2-epoxydodecane. Other suitable dendrimers include the ASTRAMOL™ brand poly(propyleneimine) dendrimers available from DSM.

Examples of transition metal organates include titanium organates, zirconium organates, hafnium organates, and the like. Examples of commercially available organates include the titanium organates sold by DuPont Chemical Co. under the tradename TYZOR™ titanates. Examples of TYZOR titanates include TYZOR TBT, which is titanium tetra-n-butoxide, TYZOR TPT, which is titanium triisopropoxide, TYZOR GBA, which is titanium diisopropoxide bis(2,4-pentanedionate), TYZOR LA, which is titanium ammoniumlactate, and TYZOR AA, which is titanium acetylacetonate.

A combination of adhesion promoters can be employed. For example, a combination of a silane and a dendrimer can be employed.

Any suitable amount of the adhesion promoter can be used, preferably in an amount of from about 0.1% by weight to about 5% by weight of the ink composition, and more preferably in an amount of from about 0.5% by weight to about 2% by weight of the ink composition.

Viscosity

It is essential to the practice of the present invention that the jet ink compositions have a viscosity of from about 1.0 to about 10 cps, and preferably from about 1.0 to about 7.0 cps, as measured at 25° C., in order to achieve the desired rheological characteristics.

All percentages expressed herein are by weight based on the total weight of the ink composition of the present invention, unless otherwise indicated.

The following examples further illustrate the present invention but, of course, should not be construed as in any way limiting its scope.

EXAMPLE 1

This example illustrates the preparation of an embodiment of the inventive jet ink composition. The jet ink composition was prepared by combining the ingredients set forth below and mixing them by continuous stirring until a smooth composition was obtained.

| Ingredients | wt. % |
| --- | --- |
| Duplicating Fluid #5, Anhydrous (Eastman Chemical) | 75.4 |
| PHS-N (Novolak Grade, TriQuest, LP) | 12.0 |
| Dimethylamine hydrochloride | 1.5 |
| FC-170 (3M) | 0.1 |
| MORFAST BLACK 101 (Keystone Aniline) | 11.0 |
| | 100.0 |

MORFAST BLACK 101 is a cobalt metal complex dye. Duplicating Fluid #5 is denatured ethanol free of MEK and methanol. The jet ink composition thus prepared was jet printed onto various glass, metal, and plastics, as well as paper substrates. The images had improved adhesion qualities. The adhesion qualities of the images on non-porous substrates are illustrated in Example 6.

EXAMPLE 2

This example illustrates the preparation of another embodiment of the inventive jet ink composition. The jet ink composition was prepared by combining the ingredients set forth below and mixing them by continuous stirring until a smooth composition was obtained.

| Ingredients | wt. % |
| --- | --- |
| Duplicating Fluid #5, Anhydrous | 74.9 |
| PHS-N | 12.0 |
| Dimethylamine hydrochloride | 1.5 |
| FC-170 | 0.1 |
| SILWET 7622 (silicone surfactant, OSI Specialties) | 0.5 |
| MORFAST BLACK 101 | 11.0 |
| | 100.0 |

The jet ink composition thus prepared was jet printed onto various glass, metal, and plastics, as well as paper substrates. The images had improved adhesion qualities. The adhesion qualities of the images on non-porous substrates are illustrated in Example 6.

EXAMPLE 3

This example illustrates the preparation of an embodiment of the inventive jet ink composition which employs a dendrimer as an adhesion promoter. The jet ink composition was prepared by combining the ingredients set forth below and mixing them by continuous stirring until a smooth composition was obtained.

| Ingredients | wt. % |
| --- | --- |
| Duplicating Fluid #5, Anhydrous | 74.4 |
| PHS-N | 12.0 |
| Dimethylamine hydrochloride | 1.5 |
| FC-170 | 0.1 |
| STARBURST dendrimer G2, 25% $C_{12}$-modified (49% in methanol) (Dendritech) | 0.5 |
| MORFAST BLACK 101 | 11.0 |
| | 100.0 |

The jet ink composition thus prepared was jet printed onto various glass, metal, and plastics, as well as paper substrates. The images had improved adhesion qualities. The adhesion qualities of the images on non-porous substrates are illustrated in Example 6.

EXAMPLE 4

This example illustrates the preparation of an embodiment of the inventive jet ink composition which employs a silane as an adhesion promoter. The jet ink composition was prepared by combining the ingredients set forth below and mixing them by continuous stirring until a smooth composition was obtained.

| Ingredients | wt. % |
| --- | --- |
| Duplicating Fluid #5, Anhydrous | 74.9 |
| PHS-N | 12.0 |
| Dimethylamine hydrochloride | 1.5 |
| FC-170 | 0.1 |
| Silane A-187 (OSI Specialty) | 0.5 |
| MORFAST BLACK 101 | 11.0 |
| | 100.0 |

The jet ink composition thus prepared was jet printed onto various glass, metal, paper, and plastics substrates. The images had improved adhesion qualities. The adhesion qualities of the images on non-porous substrates are illustrated in Example 6.

EXAMPLE 5

This example illustrates the preparation of yet another embodiment of the inventive jet ink composition which employs a silane and a dendrimer as adhesion promoters. The jet ink composition was prepared by combining the ingredients set forth below and mixing them by continuous stirring until a smooth composition was obtained.

| Ingredients | wt. % |
| --- | --- |
| Duplicating Fluid #5, Anhydrous | 74.4 |
| PHS-N | 12.0 |
| Dimethylamine hydrochloride | 1.5 |
| FC-170 | 0.1 |
| STARBURST dendrimer G2, 25% $C_{12}$-modified (49% in methanol) | 0.5 |
| Silane A-187 | 0.5 |
| MORFAST BLACK 101 | 11.0 |
| | 100.0 |

The jet ink composition thus prepared was jet printed onto various glass, metal, paper, and plastics substrates. The images had good adhesion qualities. The adhesion qualities of the images on non-porous substrates are illustrated in Example 6.

EXAMPLE 6

This example illustrates the adhesion qualities of the images printed on non-porous substrates using the jet ink composition of the present invention. The images printed on glass, metal, and plastics using the jet ink compositions illustrated in Examples 1–5 were subjected to adhesion evaluation. The test substrates included soda lime glass slides, aluminum, tin, and stainless steel plates, and PVC, polyethylene, polypropylene, PETG, and polystyrene sheets.

The images were subjected to hard rubbing 10 times using a thumb immediately after the ink dried to obtain the "initial" rub test results. The quality of the image remaining at the end of the test was rated on a scale of 1–10, with 10 being excellent and 1 being poor. The image ratings were averaged over the various test substrates and are reported herein.

The images also were subjected to hard rubbing 10 times, 24 hours after the ink dried to obtain the "24 hour" test results. The images also were autoclaved in a retort at 250° F. for 30 minutes and then subjected to rub tests, to obtain the "retort" test results. As described above, the quality of the images was rated on a scale of 1–10.

The images also were subjected to the initial and 24 hour "tape" tests. A piece of 3M brand SCOTCH™ tape was applied to the image using a light pressure, and the tape was peeled of at an angle of 45 degrees to the substrate surface. Again, the quality of the image was rated on a scale of 1–10.

The results obtained are set forth below:

| Example No.→ | Ex. 1 | Ex. 2 | Ex. 3 | Ex. 4 | Ex. 5 |
| --- | --- | --- | --- | --- | --- |
| Tests: | | | | | |
| Dry time (seconds) | 1–3 | 1–3 | 1–3 | 1–6 | 1–6 |
| Initial rub test | 5 | 3 | 8 | 6 | 8 |
| Initial tape test | 5 | 8 | 8 | 8 | 8 |
| 24 hour rub test | 6 | 7 | 7 | 7 | 7 |
| 24 hour tape test | 7 | 9 | 9 | 9 | 8 |
| Retort test | 1 | 4 | 7 | 8 | 8 |

The foregoing shows that most of the images, particularly the images produced from jet ink compositions of Examples 2–5, had good adhesion qualities with respect to non-porous substrates. The ink compositions had reasonably short dry times.

The present invention further provides a process for jet printing onto a substrate comprising projecting a stream of droplets of the above described jet ink composition to the substrate, controlling the direction of the droplets so that the droplets form the desired printed image on the substrate.

All of the references, including patents, patent application, and publications, cited herein are hereby incorporated in their entireties by reference.

While this invention has been described with an emphasis upon certain embodiments, it will be obvious to those of ordinary skill in the art that variations of the embodiments may be used and that it is intended that the invention may be practiced otherwise than as specifically described herein. Accordingly, this invention includes all modifications encompassed within the spirit and scope of the invention as defined by the following claims.

What is claimed is:

1. A jet ink composition comprising an organic solvent, a colorant, and a hydroxyaromatic resin with its hydroxyaromatic units being linked to one another by a linkage other than an alkylene ether linkage, wherein said jet ink composition has a Brookfield viscosity of from about 1.0 cps to about 7.0 cps at 25° C., an electrical resistivity of from about 20 ohm-cm to about 2,000 ohm-cm, and a sonic velocity of from about 1100 meters/second to about 1700 meters/second.

2. The jet ink composition of claim 1, wherein said hydroxyaromatic unit is hydroxyphenyl.

3. The jet ink composition of claim 2, wherein said hydroxyphenyl units are linked by alkylene linkage.

4. The jet ink composition of claim 3, wherein said alkylene linkage is —CH(CH$_3$)—.

5. The jet ink composition of claim 4, wherein said hydroxyaromatic resin is derived from 4-hydroxyphenylmethyl carbinol.

6. The jet ink composition of claim 5, wherein said resin is branched.

7. The jet ink composition of claim 6, wherein said organic solvent is substantially free of MEK and methanol.

8. The jet ink composition of claim 7, wherein said organic solvent is ethanol.

9. The jet ink composition of claim 8, wherein said colorant is a dye.

* * * * *